Nov. 15, 1927.  W. F. HEROLD  1,649,526
CASTER
Filed July 6, 1926
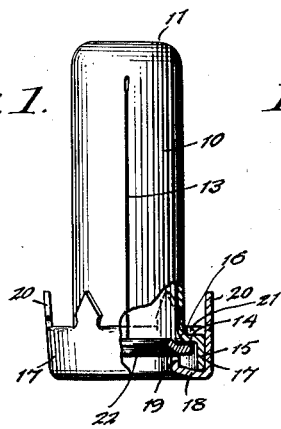
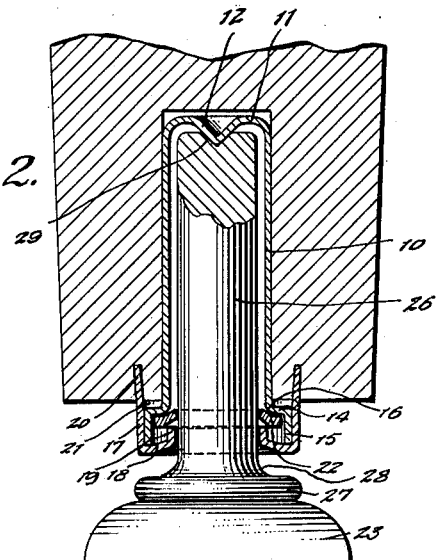
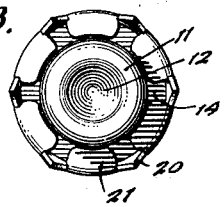
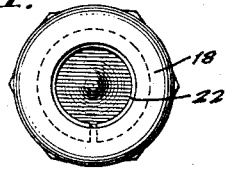
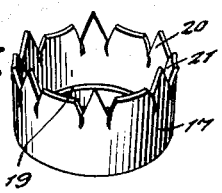
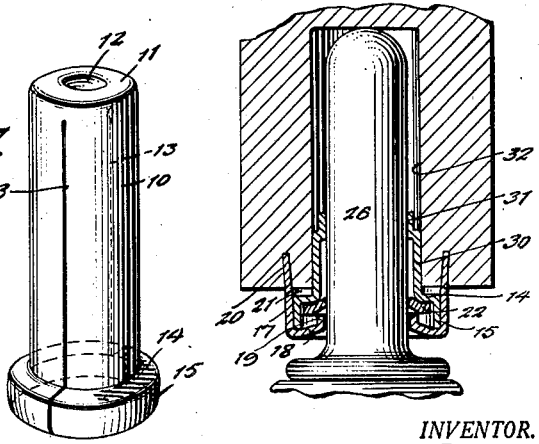
INVENTOR.
Walter F. Herold
BY
ATTORNEY Patented Nov. 15, 1927.

1,649,526

UNITED STATES PATENT OFFICE.

WALTER F. HEROLD, OF UPPER MONTCLAIR, NEW JERSEY, ASSIGNOR TO THE BASSICK COMPANY, OF BRIDGEPORT, CONNECTICUT, A CORPORATION OF CONNECTICUT.

CASTER.

Application filed July 6, 1926. Serial No. 120,670.

The present invention relates to casters, particularly an improved caster socket for use in a wood furniture leg, or the like, an object being to provide a socket formed of sheet metal, and in which holding means is provided to cooperate with the pintle independently of the pintle receiving socket shell portion, so that the latter may be of any desired size or form, without respect to the pintle shape or diameter.

Another object is to provide such means adapted to grip upon the surface of the pintle, and with which a substantially plain pintle, free of grooves, may be employed, and which will have no tendency to retard the swiveling of the caster, and further to provide such means which at no time is called upon to carry any stress due to side motion or side strain, so that the holding means is practically free of wear or deterioration.

A further object is to provide an improved assembly, including a folded sheet metal socket member, and a spring retaining base adapted to confine and retain the tubular shape of such member and to provide a substantial bottom bearing for the pintle below the holding spring. It is also proposed to provide such base member including integral means for attaching the socket to a furniture leg, without the use of screws, or other such means.

A still further object is to provide an improved type of spring ring holding means, formed of sheet metal, adapted to be accurately positioned and positively seated, to provide a lead surface for guiding the pintle into the socket, and to occupy a comparatively small space, whereby a bottom bearing may be provided without greatly increasing the thickness of the base.

It is also an object to provide a reinforced socket structure which may be directly engaged with the floor to act as a slide, and also hammered to a considerable extent, without any danger of distorting the socket structure or of binding the spring in the base.

With the above and other objects in view, an embodiment of the invention is shown in the accompanying drawings, and this embodiment will be hereinafter more fully described with reference thereto, and the invention will be finally pointed out in the claims.

In the drawings:—

Fig. 1 is a side elevation, partly in section, of a caster socket, according to the present embodiment of the invention;

Fig. 2 is a vertical sectional view thereof, inserted in the furniture leg, and with the caster mounted therein;

Fig. 3 is a top plan view of the socket;

Fig. 4 is a bottom plan view thereof;

Fig. 5 is a perspective view of the spring ring employed;

Fig. 6 is a perspective view of the base member employed;

Fig. 7 is a perspective view of the socket shell member employed; and

Fig. 8 is a vertical sectional view of a slightly modified form of socket member.

Similar reference characters indicate corresponding parts throughout the several figures of the drawings.

Referring to the drawings, the socket according to the present embodiment of the invention, comprises a tubular socket shell member 10, formed from flat sheet metal stock folded upon itself, and providing a top portion 11 including a top center pintle bearing 12 in the form of an inverted cone-shaped indenture, the longitudinal meeting edges of the blank providing longitudinal seams 13 at opposed sides of the socket member. At the base of the socket member there is provided an annular outwardly bent shoulder 14 and an annular downwardly bent flange 15, the annular under surface of the shoulder being filleted, as at 16, to provide a spring ring retaining seat, as will hereinafter more fully appear.

The base member 17, cupped up from sheet metal stock, is provided with an inwardly bent bottom flange 18 and an upwardly bent bottom pintle bearing flange 19, the flange 18 being beveled inwardly from its point of contact with the flange 15. At the upper edge of the base there are formed spaced upwardly projecting prongs 20, and between these are provided lug portions 21 adapted, as shown in Figs. 1 and 3, to be bent inwardly upon the upper surface of the shoulder 14 to secure the base to the socket member, the pintle retaining spring ring 22 being loosely disposed and retained in the annular space between the shoulder 14 and flange 15 and the bottom pintle bearing flange 19.

The split spring ring is preferably of the type disclosed and claimed, per se, in my copending application Serial Number 120,672, filed July 6, 1926, being formed of sheet metal, and having a cylindrical outer periphery and a beveled flanged inner periphery, the latter having the three-fold function of imparting the necessary springiness or tension to the sheet metal, providing an upper seating surface to engage the filleted seat 16 of the socket, and providing a beveled lead surface for guiding the pintle into the socket, without any chance of jamming the ring or pulling it out of its recess. The cylindrical outer periphery and the flat upper and lower adjacent surfaces insure a positive positioning of the ring in relation to the shoulder 14 and flange 15. The inner diameter of the ring in its normal or unsprung relation is smaller than that of the bottom bearing flange 19 and its outer diameter is smaller than the inner diameter of the flange 15. The annular space between the flanges 15 and 19 is less than the lateral thickness of the ring, so that the latter will not lodge in this space upon being shifted laterally against the flange 15, while the beveled surface of the ring is so dimensioned that upon such shifting movement the flat under surface of the ring will not be exposed within the pintle receiving opening of the flange 19, and any possibility of jamming through engagment with such flat surface is prevented.

The detachable caster consists of the usual horn 23 having a caster wheel 24 rotatably carried therein upon an axle 25, and having a pintle 26 secured in its upper transverse portion, the lower end of the pintle being provided with a flange 27 engaging the upper surface of the horn, a rounded fillet surface 28 being formed between the flange and the cylindrical pintle surface. At the upper end of the pintle there is provided a cone-shaped recess 29 adapted to engage the top center bearing 12. The diameter of the pintle is such that its lower portion will expand the ring 22 and be thus held thereby against dropping out of the socket, the ring being snugly held about the pintle and freely rotatable within the recess formed between the socket and base members.

In the operative or engaged position of the caster, as shown in Fig. 2, the pintle has thrust bearing upon the center top bearing 12, being held vertically by the substantial bottom bearing provided by the flange 19. The spring ring firmly retains the caster against dropping out, but its relation is such that there is no tendency to frictionally resist or retard the swiveling action of the caster.

The flanged structure of the socket and base members provides a very strong rigid construction, adapted to withstand heavy side strains, and is sufficiently reinforced, so that, before insertion of the caster pintle, it may be directly engaged with the floor surface, and moved about as a sliding support to a considerable extent, without danger of crumpling or distortion; the reinforcement provided by the flange 15 providing a strong rigid support, while the beveling of the flange 18 inwardly of the flange 15 relieves the flange 19 of any pressure, so that there is no danger of forcing it into binding contact with the spring ring. Also, this structure is such that it may be hammered into place with relatively heavy blows, without danger of distortion, or binding the spring ring, the hammer blows being directed upon the base at the annular portion directly below the flange 15, which latter takes the force of the blows, the flange 19 being protected by the beveling of the flange 18.

In Fig. 8 I have illustrated a modification, in which the pintle receiving member is in the form of a relatively short open-ended tubular thimble 30, preferably flanged inwardly at its inner end, as at 31, to fit the pintle diameter, the pintle having top bearing directly on the end of the drilled hole 32 in the furniture leg.

The socket member, according to my invention, may be of any desired diameter, or metal thickness, independently of the pintle diameter, the bottom holding ring doing away with the necessity for providing pintle holding means within such member, or formed integrally therewith. The invention is adapted not only for the attachment of casters, but of slides, and other means adapted to be engaged within a socket by a pintle.

I have illustrated and described a preferred and satisfactory embodiment of the invention, but it will be obvious that changes may be made therein, within the spirit and scope thereof, as defined in the appended claims.

Having thus described my invention, what I claim and desire to secure by Letters Patent is:—

1. In a socket for casters, or the like, a tubular leg engaging element having an axially extending flange at its lower end, a base member assembled and secured to said flange to provide a permanently connected socket unit and providing therewith a spring retaining pocket, and spring means disposed in said pocket.

2. In a socket for casters, or the like, a leg engaging element, a base member assembled and secured directly thereto to provide a permanently connected socket unit and providing with said element a spring retaining pocket, said base member having integral prongs adapted to be inserted in a furniture leg or the like to secure said socket, and spring means disposed in said pocket.

3. In a socket for casters, or the like, a tubular leg engaging element having a flange at its lower end, a base member engaged therewith providing with said element a spring retaining pocket, said base member having integral spaced prongs adapted to be inserted in a furniture leg or the like to secure said socket, lugs between said prongs bent into relation with said flange to secure said base member to said tubular element, and spring means disposed in said pocket.

4. In a socket for casters, or the like, a tubular leg engaging element having an outwardly bent shoulder and a downwardly bent flange at its lower end, a cup-shaped centrally apertured base member secured about said downwardly bent flange and spaced by said flange with relation to said shoulder to provide an annular spring retaining pocket, and spring means disposed in said pocket.

5. In a socket for casters, or the like, a tubular leg engaging element having an outwardly bent shoulder and a downwardly bent flange at its lower end, a cup-shaped centrally apertured base member engaged about said downwardly bent flange and spaced by said flange with relation to said shoulder to provide an annular spring retaining pocket, integral lug portions carried by said base member bent into relation with said shoulder to secure said base member to said tubular element, and spring means disposed in said pocket.

6. In a socket for casters, or the like, a tubular leg engaging element having an outwardly bent shoulder at its lower end, a centrally apertured base member having an upwardly bent bottom pintle bearing flange and providing with said shoulder an annular spring retaining pocket, means adapted to reinforce said pocket against axial collapse, and spring means disposed in said pocket.

7. In a socket for casters, or the like, a leg engaging element, a base member secured thereto having a pintle receiving aperture and providing with said element a ring retaining annular pocket, and a spring ring disposed in said pocket including a beveled flange portion at its inner periphery, a cylindrical outer periphery, and flat upper and lower surfaces between said flange and said outer periphery, said beveled flange portion being disposed transversely above the edge of said pintle receiving aperture.

8. In a socket for casters, or the like, a leg engaging element, a base member secured thereto and providing with said element a spring retaining pocket, means adapted to reinforce said pocket against axial collapse and spring means disposed in said pocket.

9. In a socket for casters, or the like, a leg engaging element, a base member secured thereto and providing with said element a spring retaining pocket, means adapted to reinforce said pocket against axial collapse, a spring ring disposed in said pocket, said base including an annular impact portion in axial register with said reinforcing means and a pocket forming portion disposed inwardly of the plane of said impact portion.

10. In a socket for casters, or the like, a leg engaging element, a base member secured thereto and providing with said element a spring retaining pocket, a spring ring disposed in said pocket, said base including an annular impact portion, and reinforcing means disposed between said impact portion and said leg engaging element.

11. In a socket for casters or the like, a socket member having a pintle-receiving portion and an outwardly enlarged bottom portion, an apertured base member having an upwardly extending outside flange engaging against the outer surface of said enlarged socket portion and an inwardly extending base portion extending beneath said enlarged portion, and pintle-engaging spring means within said enlarged portion.

Signed at Newark, in the county of Essex, and State of New Jersey, this 25th day of June, 1926.

WALTER F. HEROLD.